United States Patent [19]

Fertell et al.

[11] Patent Number: 4,601,951

[45] Date of Patent: Jul. 22, 1986

[54] IMPREGNATION OF LEATHER WITH POLYURETHANE DISPERSIONS

[75] Inventors: Paul A. Fertell, Wilmington, N.J.; John McCartney, Chester, Pa.; Giandaniele Robbiati, Milan, Italy

[73] Assignee: Steon Company, Newark, N.J.

[21] Appl. No.: 557,942

[22] Filed: Dec. 5, 1983

Related U.S. Application Data

[63] Continuation of Ser. No. 260,042, May 4, 1981, abandoned.

[51] Int. Cl.[4] ........................ B32B 27/00; B32B 27/04

[52] U.S. Cl. ................................ 428/423.4; 427/341; 427/389; 428/473; 428/904

[58] Field of Search .................. 428/423.4, 423.1, 904, 428/540, 341, 473; 427/389, 341

[56] References Cited

U.S. PATENT DOCUMENTS

| | | | |
|---|---|---|---|
| 3,282,726 | 8/1963 | Seligsberger | 428/423.4 |
| 3,761,304 | 11/1973 | Hansson | 428/423.4 |

FOREIGN PATENT DOCUMENTS

| | | | |
|---|---|---|---|
| 2544068 | 10/1975 | Fed. Rep. of Germany | 428/423.4 |
| 1214773 | 12/1970 | United Kingdom | 428/540 |

*Primary Examiner*—Marion C. McCamish
*Attorney, Agent, or Firm*—Webb, Burden, Robinson & Webb

[57] ABSTRACT

A method of preparing an impregnated leather composite is provided. A low density leather sheet is impregnated with an aqueous ionic dispersion of a polyurethane polymer. The polyurethane polymer which is impregnated in the leather sheet is ionically coagulated from the dispersion. The impregnate is dried to form an impregnated leather composition.

24 Claims, No Drawings

IMPREGNATION OF LEATHER WITH POLYURETHANE DISPERSIONS

This application is a continuation of application Ser. No. 260,042, filed May 4, 1981, now abandoned.

BACKGROUND OF THE INVENTION

1. Field of the Invention

This invention relates to leather treatment and more particularly to the upgrading of low density leather.

2. Description of the Prior Art

"Low density leather" as used herein means and refers to leather splits, whole non-bovine and reptilian leathers such as goat, pig, sheep, rabbit, raccoon, fox, snake and the like. Typically, these low density leathers have a bulk density in the range of 0.3 to 0.8 g/cc and are distinguished from top grain bovine leather which has a high density.

Top grain leather is a venier of the hide which, after removal, leaves a great deal of leather known as "leather splits." Thus, the term "leather splits" as used herein means and refers to the material remaining in a leather hide after removal of the top grain venier. The top grain is an especially valuable material due to its strength and when finished in accordance with known finishing procedures is used in the highest quality footwear. It is recognized by those skilled in the art that top grain leather can be improved. Such improvement can be conducted in accordance with the present invention by densification to improve the leather structure. For example, bovine top grain leather can be densified to a density comparable to horsehide thus providing properties comparable to a "cordovan" leather.

The present invention is applicable to leather splits from the skins of reptiles and mammals including cattle and horses and to top grain low density leather regardless of the method of tanning, whether the same be chrome-tanned, zirconium-tanned, vegetable-tanned or by synthetic tanning agents. Such tanning techniques are well known to those skilled in the art.

Leather splits have commercial application in buffed, dyed, "reverse" or suede leather products. However, the lower strength and relatively coarse texture of the split products compared to top grain leather have precluded their use broadly in shoe uppers. Due to the porosity of split leather, it cannot be finished in the same manner as top grain leather since the solution coatings coventionally used with top grain leather will penetrate split leather, resulting in a boardy product with no actual top finish.

It is important in leather products used, for example in shoe uppers, that the interior thereof absorb moisture from the foot while moisture is desirably precluded from passing from the exterior to the interior. Yet while passage of moisture is undesirable, passage of moisture vapor, that is moisture vapor permeability or breathability, of the shoe upper is recognized to be a necessary characteristic of such materials. Solution or liquid coating of split leathers, while precluding passage of moisture as liquid water, also precludes passage of moisture vapor, rendering coated products moisture vapor impermeable.

It has long been an objective of workers in the leather industry to effectively use leather splits to form a product useful in a broad range of products where top grain cowhide is the material of choice. Such efforts are exemplified by the teachings of U.S. Pat. Nos. 3,827,930 and 4,218,505, which teach laminates of leather splits and polyurethane films.

In another aspect of the invention, low density top grain leathers have been used to make gloves, handbags, clothing and the like, but are not useful as shoe uppers because they are low in integrity, memory and flex-fold characteristics. Even when low density leathers are used in the less demanding applications they do not have the long term wear characteristics of top grain cowhide. The low density characteristics of these leathers are attributable in part to the high concentration of fats in the animal hide which, during the tanning process, are removed leaving a highly porous network of loosely bonded fibers. Thus, the low density top grain leathers have reduced physical properties when compared to top grain cowhide. The configuration of fibers is not suitable for finishing to top grain uses in shoe uppers.

In yet another aspect, when low density top grain leathers are used in clothing, the thickness should be as low as possible to render a garment which has good hand and drape. However, sufficient thickness must be maintained to provide a garment with some integrity.

In accordance with the present invention, a process is provided wherein the physical and chemical properties of low density leathers are upgraded.

Further, in accordance with the present invention, leather splits are upgraded to provide a product having all the advantages of top grain cowhide.

BRIEF DESCRIPTION OF THE INVENTION

A method of preparing an impregnated leather composition is provided. A low density leather sheet is impregnated with an aqueous ionic dispersion of a polyurethane polymer. The polyurethane polymer which is impregnated in the leather sheet is ionically coagulated from the dispersion. The impregnate is dried to form an impregnated leather composition. When the low density leather sheet is a leather split, subsequent to drying the impregnated leather composition, a grain layer is imparted to at least one surface of the composition by the application of heat and pressure thereto.

DETAILED DESCRIPTION OF THE INVENTION

The polyurethanes useful in the practice of the present invention are those recognized in the art as ionically water dispersible. These dispersions are in contrast with emulsified isocyanate copolymers such as those disclosed in U.S. Pat. No. 2,968,575, and prepared and dispersed in water with the aid of detergents under the action of powerful shearing forces. The emulsified polyurethanes have the disadvantage that a detergent must be used to form the emulsion and such detergent is usually retained in the dried emulsion coating, thus seriously detracting from the overall physical and chemical properties of the final product. Further, insufficient shearing force results in unstable products, and the material cannot usually be produced in conventional reaction kettles because of the need for a high shearing force.

The preferred system for preparing an ionic aqueous polyurethane dispersion is to prepare polymers that have free acid groups, preferably carboxylic acid groups covalently bonded to the polymer backbone. Neutralization of these carboxyl groups with an amine, preferably a water soluble mono-amine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups due to the stearic hinderance of the carboxyl by the adjacent alkyl groups. This approach provides the desired carboxyl containing polymer with the carboxylic groups being neutralized with the tertiary mono-amine to provide an integral quaternary ammonium salt and hence, water dilutability.

Suitable carboxylic acids and preferably the stearically hindered carboxylic acids are well known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula,

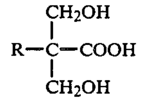

wherein R represents hydrogen or alkyl of up to 20 carbon atoms and preferably up to eight carbon atoms. A preferred acid is 2,2-di-(hydroxymethyl) propionic acid. The polymers with the pendent carboxyl groups are characterized as anionic polyurethane polymers.

Further, in accordance with the present invention, an alternate route to confer water dilutability is to use a cationic polyurethane having pendent amino groups. Such cationic polyurethanes are disclosed in U.S. Pat. No. 4,066,591, incorporated herein by reference, and particularly in Example XVIII. In the context of the present invention it is preferred that the anionic polyurethane be used.

The polyurethanes useful in the practice of the invention more particularly involve the reaction of di- or polyisocyanate and compounds with multiple reactive hydrogens suitable for the preparation of polyurethanes. Such diisocyanates and reactive hydrogen compounds are more fully disclosed in U.S. Pat. Nos. 3,412,054 and 4,046,729. Further, the process to prepare such polyurethanes is well recognized as exemplified by the aforementioned patents. In accordance with the present invention, aromatic, aliphatic and cycloaliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene bis(4-phenylisocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene bis(4-cyclohexylisocyanate); tetrahydronaphthylene diisocyanate; isophorone diisocyanate and the like. Preferably, the arylene and cycloaliphatic diisocyanates are used most advantageously in the practice of the invention.

Characteristically, the arylene diisocyanates encompass those in which the isocyanate group is attached to the aromatic ring. The most preferred isocyanates are the 2,4 and 2,6 isomers of tolylene diisocyanate andmixtures thereof, due to their ready availability and their reactivity. Further, the cycloaliphatic diisocyanates used most advantageously in the practice of the present invention are 4,4'-methylene bis(cyclohexyl isocyanate) and isophorone diisocyanate.

The isocyanate is reacted with the multiple reactive hydrogen compounds such as diols, diamines, or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000, and in the context of the present invention, the most preferred is from about 400 to 7,000. Further, the polyester polyols improve flexibility proportionally with the increase in their molecular weight.

Examples of the polyether polyols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound $HO(CH_2OC_2H_4O)_nH$, wherein n is an integer greater than one, can also be used.

The polyol may also be a hydroxy terminated or a hydroxy pendent polyester which can be used instead of or in combination with the polyalkylene ether glycols. Exemplary of such polyesters are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally preferred to impart flexibility. These glycols are reacted with aliphatic, cycloaliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition, polycaprolactone terminated with hydroxyl groups may also be used.

One particularly useful polyurethane system is the crosslinked polyurethane system which is more fully disclosed in U.S. patent application Ser. No. 947,544, filed Oct. 2, 1978 of Andrea Russiello entitled "Crosslinked Polyurethane Dispersions", incorporated herein by reference, along with the crosslinked and non-crosslinked polyurethane compositions recited in U.S. Pat. No. 4,171,391, incorporated herein by reference.

When used herein, "ionic dispersing agent" means an ionizable acid or base capable of forming a salt with the solubilizing agent. These "ionic dispersing agents" are amines and preferably water soluble amines such as triethylamine, tripropylamine, N-ethyl piperidine, and the like; also, acid and preferably water soluble acids such as acetic, propionic, lactic, and the like. Naturally, an acid or amine will be selected contingent on the solubilizing group pendent on the polymer chain.

It is preferred that the impregnated leather composition in accordance with the invention be highly flexible and approximate the flexibility of top grain cowhide when leather splits are the low density leather starting material. When top grain low density leathers are used as the low density leather starting material, the final impregnated leather composition should be about as flexible as the top grain leather starting material. Therefore, the polyurethane polymer must behave in an elastomeric manner. The desired elastomeric behavior would generally require about 25 to 80 percent by weight of a long chain polyol (i.e., 700 to 2,000 eq. wt.) in the polymer. The degree of elongation and elasticity may vary widely from product to product depending upon the desired properties of the final product.

In forming the polyurethanes useful in the practice of the invention, the polyol and a molar excess of diisocyanate are reacted to form an isocyanate terminated polymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically, the reaction is carried out with stirring at about 50° C. to about 120° C. for about one to four hours. To provide pendent carboxyl groups, the isocyanate terminated polymer is reacted with a molar deficiency of dihydroxy acid for one to four hours at 50° C. to 120° C. to form isocyanate terminated prepolymer. The acid is desirably added as a solution, for example, in N-methyl-1,2-pyrrolidone or N-N-dimethylformamide. The solvent for the acid will typically be no more than about 5 percent of the total charge in order to minimize the organic solvent concentration in the polyurethane composition. After the dihydroxy acid is reacted into the polymer chain, the pendent carboxyl groups are neutralized with an amine at about 58° C. to 75° C. for about twenty minutes and chain extension and dispersion are accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. It is to be noted that the polyurethanes of the invention are thermoplastic in nature, i.e., not capable of extensive further curing after formation except by the addition of an external curing agent. Preferably, no such curing agent is added to form the impregnated leather composition.

Sufficient water is used to disperse the polyurethane at a concentration of about 10 to 40 percent by weight solids and a dispersion viscosity in the range of 10 to 1,000 centipoise. Viscosity may be adjusted in accordance with the particular impregnation properties desired and adapted to the density of the low density leather sheet and by the particular dispersion composition which are all dictated by the final characteristics of the impregnated leather sheet. It should be noted that no emulsifiers or thickeners are required for the stability of the dispersions.

Those of ordinary skill in the art recognize ways to modify the primary polyurethane dispersions according to end product uses, for example, by the addition of coloring agents, compatible vinyl polymer dispersions, ultraviolet filtering compounds, stabilizers against oxidation, and the like.

The characterization of the dispersions prepared in accordance with the invention is done by measurements of non-volatile content, particle size, viscosity measurements and by stress strain properties on strips of cast film.

The concentration range of polyurethane in the dispersion useful in the practice of the invention is governed by the desirable percent add on of polymer into the low density leather sheet.

The dispersion viscosity is generally in the range from 10 to 1,000 centipoise. The low viscosity, relative to that of identical polymers at the same solids level in organic solvent polymer solutions, assists rapid and complete penetration of the aqueous dispersion into the low density leather. Useful solutions of polyurethanes will, in contrast, generallly have viscosities of several thousand centipoise ranging as high as 50,000 centipoise at concentrations of 20 to 30 percent.

Particle size, as a useful measure of stability, may be measured by light scattering. Useful dispersions having non-settling characteristics will have particles of a diameter of less than 1 micron.

In the process of the invention, the low density leather sheet material is impregnated with polyurethane up to about 40 percent by weight of the total impregnated leather composition weight. As low as 5 percent polyurethane in the impregnated leather composition improves properties, and desirably 10 to 20 percent is the most advantageous level. Properties such as tensile strength, tear strength and bias elongation characterize the impregnated composition as pertinent to leather products in the shoe, upholstery and garment industries.

The low density leather sheet can be impregnated with the polyurethane dispersion by standard impregnating techniques. However, the most preferred method of impregnation is by "full impregnation" wherein the low density leather sheet is completely saturated with polyurethane dispersion thereby eliminating all voids within the leather sheet. This method of full impregnation allows for controlled final polyurethane add on by the adjustment of the solids concentration of the polyurethane dispersion.

Coagulation is accomplished by contacting the impregnated low density leather sheet with an aqueous solution of an ionic media designed to ionically replace the solubilizing ion. In theory, although not intended to be bound by such theory, in the case or an anionically solubilized polyurethane, the amine which neutralizes the carboxyl containing polyurethane is replaced with a hydrogen ion which reverts the anionic pendent carboxyl ion, thus reverting the polyurethane polymer to its original, "non-dilutable" condition. This causes coagulation of the polymer within the leather structure.

In the case of the anionic polymer, aqueous acetic acid solutions at concentrations of 0.5 to about 10 percent are suitable ionic coagulants for the anionic dispersions and are preferred over stronger acids because of the relative ease handling, low corrosion potential and disposability. Other acids substantially soluble in water at equivalent concentrations may be used. The coagulation is quite rapid, so rapid, in fact, that polymer is substantially entirely retained within the leather structure, with no polymer loss by migration into the ionic solution.

"Salting-out" to coagulate the dispersion by the addition of the neutral salt is feasible, but is not favored because of the large amounts of salt needed, about ten times the concentration of acid, and attendant problems of product contamination.

Another, and most preferred method, of coagulation an anionic polyurethane dispersion is by thermal coagulation. In this method a salt of hydrofluorosilicic acid is added to the dispersion prior to impregnation and subsequent to impregnation, the impregnate is heated thereby generating acid which causes coagulation of the dispersion. This method is more fully disclosed in U.S. patent application Ser. No. 234,464, filed Feb. 17, 1981 by John McCartney entitled "Thermal Coagulation of Polyurethane Dispersions", incorporated herein by reference and made a part hereof.

Retained aqueous phase after the coagulation step is removed by conventional means. For example, the impregnated leather sheet may be passed through squeeze rolls, rinsed in water, and dried by heated air or infrared radiation.

In a typical process, the low density leather sheet is fully saturated with polyurethane dispersion in a suitable vessel. The surface of the impregnated leather sheet is wiped to remove excess aqueous dispersion. The polyurethane is then coagulated either thermally or with a solution of counterion. The impregnate is then squeezed to remove excess water and dried in an oven.

In the instance where the low density leather sheet is leather splits, the dried impregnated leather composition is placed in a heated press and pressure is applied to at least one side of the leather composition. The heat and pressure fuse the polymer to itself within the impregnate at the surfaces of the material; but yet insufficient to completely fuse the polymer at the interior of the material. Thus, a density gradient from the interior of the material to the exterior of the material is developed. Other physical techniques for developing a grain layer are more fully disclosed in U.S. patent application Ser. No. 188,330, filed Sept. 18, 1980 entitled "Simulated Leather Sheet Material" by John McCartney, incorporated herein by reference.

Subsequent to forming the impregnated leather composition, it may be further split and treated by finishing and the like, by standard leather processing techniques.

The following Examples are illustrative of the invention.

EXAMPLE I

A cowhide leather split which was dyed and ready for sale had the following characteristics:

| | |
|---|---|
| Instron tongue tear (lbs.) | 8.00 |
| Basis weight (g/m$^2$) | 1080.00 |
| Density (g/cc) | 0.63 |
| Thickness (cm) | 0.17 |

The split was immersed in a polyurethane dispersion composed of 2 parts by weight of a crosslinked polyurethane dispersion prepared in accordance with Example III of U.S. patent application Ser. No. 947,544, previously cited herein, and one part by weight of a crosslinked polyurethane dispersion recited in U.S. Pat. No. 4,171,391, incorporated herein by reference. The dispersion blend was adjusted to 25 percent solids. After the leather sheet was fully impregnated with polyurethane dispersion, it was removed from the bath and excess dispersion was removed from the sheet by wiping. The impregnate was placed in a 10 percent aqueous acetic acid bath for ten minutes to coagulate the polyurethane dispersion. The impregnated sheet was washed with water, squeezed, and dried at 135° F. for 2 minutes in a heated press with no application of pressure except to insure heat transfer from the plates of the press to the impregnated leather composition.

The impregnated leather composition had the following characteristics:

| | |
|---|---|
| Instron tongue tear (lbs.) | 20.00 |
| Basis weight (g/m$^2$) | 1490.00 |
| Density (g/cc) | 0.85 |
| Thickness (cm) | 0.17 |

As is shown in Example I, the impregnated leather composite in accordance with the invention had a greater than threefold increase in tear strength over the leather split starting material. Further, the impregnated leather composite exhibited good hand and drape.

EXAMPLE II

Two sheets of the impregnated leather composition of Example I were placed back to back and pressed at 150° C. for 2 minutes at 1,900 psi in a heated press. The surfaces of the leather composition contacting the press plates developed a high density grain layer while the interior contacting surfaces of the leather composite remained as splits. The two sheets were separated and each sheet had the following characteristics:

| | |
|---|---|
| Instron tongue tear (lbs.) | 23.00 |
| Basis weight (g/m$^2$) | 1450.00 |
| Density (g/cc) | 0.80 |
| Thickness (cm) | 0.18 |

The impregnated leather composition of this Example had good hand and drape and characteristics similar to top grain cowhide.

EXAMPLE III

Example II was repeated with a second cowhide leather split having similar properties to the split of Examples I and II, except that it was pressed at 3,500 psi.

The two sheets, when separated, had the following characteristics:

| | |
|---|---|
| Instron tongue tear (lbs.) | 32.00 |
| Basis weight (g/m$^2$) | 1800.00 |
| Density (g/cc) | 1.30 |
| Thickness (cm) | 0.13 |

The leather composite of this Example had properties similar to top grain cordovan leather.

In addition to splits which are dyed and processed in accordance with standard leather manufacturing techniques, wet splits may be used as the starting material in accordance with the invention.

Further, a cowhide and horsehide grain layer may be improved by impregnation in accordance with the invention.

Although the invention has been described with reference to specific materials and specific processes, it is only to be limited so far as is set forth in the accompanying claims.

We claim:

1. A method of impregnating leather comprising:

impregnating a leather sheet by completely saturating the leather sheet to eliminate all voids therefrom with an aqueous ionic dispersion of a polyurethane polymer;

ionically coagulating said polyurethane polymer from said dispersion impregnated in said leather sheet; and drying the impregnant to form an impregnated leather having improved tear strength.

2. The method of claim 1 wherein said polyurethane polymer has solubilizing ionizable groups covalently bonded to the polymer chain which are reacted with an ionic dispersing agent.

3. The method of claim 1 wherein said polyurethane polymer has substantially no unreacted N=C=O groups.

4. The method of claim 1 wherein said leather is a low density leather.

5. The method of claim 4 including heating the impregnated low density leather under heat and pressure, said heat and pressure being applied to at least one surface thereof to develop a grain layer.

6. The method of claim 4 wherein said low density leather is fully impregnated with the polyurethane dispersion.

7. The method of claim 4 wherein said low density leather has a bulk density of 0.3 to 0.8 g/cc.

8. The method of claim 4 wherein said low density leather is a leather split.

9. The method of claim 4 wherein said low density leather is selected from the group consisting of pig skin and sheep skin.

10. The method of claim 1 including removing substantially all of the dispersing agent from the impregnated sheet prior to said drying.

11. The method of claim 1 wherein said polyurethane dispersion is coagulated by thermal coagulation.

12. The method of claim 1 wherein said aqueous ionic polyurethane polymer dispersion has a solids content of 5 to 50 percent by weight.

13. The method of claim 1 wherein said aqueous ionic polyurethane polymer dispersion has a viscosity of 10 to 5,000 centipoise.

14. The method of claim 1 wherein said dried impregnant is comprised of up to 40 percent by weight of polyurethane polymer.

15. The method of claim 1 wherein said dispersion is a crosslinked polyurethane dispersion.

16. The method of claim 1 wherein said dried impregnant has a bulk density of 0.5 to 1.3 g/cc.

17. An impregnated leather composite comprised of a leather sheet having an ionically coagulated aqueously ionically solubilized polyurethane polymer impregnated throughout said leather sheet at a level sufficient to improve the tear strength of said leather, said composite having an internal structure attributable to the complete saturation thereof with an impregnant from which said ionically coagulated aqueously ionically solubilized polyurethane is derived, and said composite having a bulk density less that its actual density.

18. The impregnated leather composite of claim 17 wherein said polyurethane polymer is a crosslinked polyurethane polymer.

19. The impregnated leather composition of claim 17 having at least one grain layer.

20. The impregnated leather composition of claim 17 having up to 40 percent by weight of polyurethane polymer impregnated therein.

21. The impregnated leather composition of claim 17 wherein said leather is low density leather.

22. The impregnated leather composition of claim 21 wherein the low density leather is a leather split.

23. The impregnated leather composition of claim 21 wherein the low density leather has a bulk density of 0.3 to 0.8 g/cc.

24. The impregnated leather composition of claim 21 wherein low density leather is selected from the group consisting of pig skin and sheep skin.

* * * * *